(12) United States Patent
Alkevicius

(10) Patent No.: US 6,641,193 B2
(45) Date of Patent: Nov. 4, 2003

(54) WASTE CHUTE AND CONTAINER FOR A PICKUP TRUCK WITH A REAR SLIDING WINDOW

(76) Inventor: David Alkevicius, 36818 Ladywood, Livonia, MI (US) 48154

( * ) Notice: Subject to any disclaimer, the term of this patent is extended or adjusted under 35 U.S.C. 154(b) by 0 days.

(21) Appl. No.: 09/900,983

(22) Filed: Jul. 9, 2001

(65) Prior Publication Data

US 2003/0006621 A1 Jan. 9, 2003

(51) Int. Cl.[7] .................. B60N 3/12; B60R 11/06; B60R 7/00
(52) U.S. Cl. .................... 296/37.8; 296/37.6
(58) Field of Search .............. 296/37.6, 37.8; 224/404

(56) References Cited

U.S. PATENT DOCUMENTS

| | | | |
|---|---|---|---|
| 3,510,055 A | * | 5/1970 | Safford |
| 4,013,215 A | * | 3/1977 | Mercier |
| 4,096,959 A | | 6/1978 | Schäffler .................. 214/302 |
| 4,147,100 A | * | 4/1979 | Dykstra |
| D260,633 S | | 9/1981 | Gorman .................. D12/157 |
| 4,580,827 A | | 4/1986 | Feagan .................. 296/37.6 |
| 4,635,992 A | | 1/1987 | Hamilton et al. ......... 296/37.6 |
| 4,700,623 A | * | 10/1987 | Durbin et al. |
| 4,728,017 A | | 3/1988 | Mullican ............... 224/42.42 |
| 4,752,095 A | | 6/1988 | Brady ..................... 296/37.6 |
| 4,892,346 A | | 1/1990 | Berlin ..................... 296/37.6 |
| 4,907,710 A | * | 3/1990 | Bulkens |
| 4,946,215 A | | 8/1990 | Taylor .................... 296/37.6 |
| 4,993,771 A | | 2/1991 | Ingerson et al. .......... 296/37.6 |
| 5,083,828 A | | 1/1992 | Accettura ................ 296/37.6 |
| 5,118,037 A | * | 6/1992 | Ekegren |
| 5,121,306 A | * | 6/1992 | Palmisano |
| 5,263,757 A | | 11/1993 | Reed ....................... 296/24.1 |
| 5,316,358 A | | 5/1994 | Payne et al. ............. 296/37.6 |
| 5,439,150 A | | 8/1995 | Trahms .................... 224/404 |
| 5,524,951 A | | 6/1996 | Johnson .................. 296/37.6 |
| 5,597,103 A | | 1/1997 | Nichols ................... 224/324 |
| D414,302 S | | 9/1999 | Potestio .................. D30/108 |
| 6,007,128 A | | 12/1999 | Hines, Jr. ............... 296/37.6 |
| 6,139,080 A | | 10/2000 | Saffold .................. 296/37.6 |
| 6,170,723 B1 | | 1/2001 | Howell ................... 224/404 |

* cited by examiner

Primary Examiner—Joseph D. Pape
Assistant Examiner—Scott Carpenter
(74) Attorney, Agent, or Firm—Gifford, Krass, Groh, Sprinkle, Anderson & Citkowski, P.C.

(57) ABSTRACT

A waste chute and container assembly for use with a pickup truck. The truck includes a cab portion and a bed portion defined by at least a bottom, front wall and sides. A rear sliding window separates the cab and bed portions. The chute and container assembly includes a housing supported upon the truck bed portion and located proximate its front wall. The housing defines a substantially hollowed interior within which are defined a pair of opposing and extending track portions. A chute inlet is defined in a forwardly facing location of the housing, proximate the rear sliding window, and for receiving in inserting fashion items deposited by individuals seated within the cap portion. A waste container secures within the housing hollowed interior and is communicable by items placed in the chute inlet. The waste container includes a pair of recessed guide portions which are received between the track portions to slidably engage the waste container within the housing and permit the container to be disengaged, emptied and reinstalled in the housing.

10 Claims, 5 Drawing Sheets

WASTE CHUTE AND CONTAINER FOR A PICKUP TRUCK WITH A REAR SLIDING WINDOW

BACKGROUND OF THE INVENTION

1. Field of the Invention

The present invention relates generally to waste container assemblies and, more particularly, to a waste chute container for use with a cargo bed portion of a pickup truck and which is accessible by individuals within the cab portion through a sliding rear window.

2. Description of the Prior Art

The prior art is well documented with examples of truck bed mounted storage and holding containers. U.S. Pat. No. 5,439,150, issued to Trahms, teaches such a truck storage box having a center compartment accessible through the rear window of an associated pickup truck. The storage box is provided with a main body positionable within the truck bed behind the rear window to rest upon the upper surfaces of the truck bed. The center compartment is pivotally mounted to the main body and may be opened to facilitate access into the main body by a person within the truck through the rear window.

In addition, the center compartment houses a briefcase which may be accessed through a separate lid. The briefcase is slidably disposed within the center compartment and may be extended into the truck through the rear window to allow access to articles within the briefcase or, alternatively, the briefcase may be completely removed from the upper compartment. An alternate embodiment of the present invention includes a sliding door assembly operable to enclose a volume of space between the main body of the box and the truck bed to provide additional storage capabilities.

U.S. Pat. No. 5,524,951, issued to Johnson, teaches another variation of a cargo box installed between a pickup truck bed and a cap. The box includes a lid, sides, and a back panel, with the lid being hingedly mounted to the cab. The box extends laterally across the width of the bed and forms a sealed chamber to isolate its contents from the environment. The rear side of the cargo box and the front side of the bed include aligned openings therethrough to receive long items. The front of the box includes an opening to allow an individual within the cab access to the contents of the box.

U.S. Pat. No. 5,263,757, issued to Reed, discloses a cargo box for insertion into the rear window of the cab of a pickup truck. The box includes an annular, flat mounting plate, an outer periphery thereof being sized and shaped for insertion between a pair of generally straight sides of a "U" shaped well of a seal for the rear window. The cargo box is resiliently supported by a support including a rigid bar extending between and supported by the side rails of the truck box. A spool-shaped and elastomeric bushing is secured to the rigid bar and abuts with the bottom of the storage enclosure. The cargo box can be received in the opening in the front of a topper to allow their simultaneous use on the truck. Finally, an inflatable and annular boot having a "U" shaped cross section can be provided around the topper opening with first and second legs extending on opposite sides of the topper front. The boot, when inflated in position, abuts with and seals with one or both of the mounting plate and the annulator shaped front end of the storage enclosure.

SUMMARY OF THE PRESENT INVENTION

The present invention is a waste chute and container assembly for use with a pickup truck bed and which is an improvement over the prior art in that it provides individuals seated within a cab portion of the vehicle to efficiently and effectively deposit waste and other discardable items. Heretofore, such garbage and waste items have either been left to accumulate within the vehicle interior. Alternatively, attempts have been made to segregate the trash within the vehicle's cab, such as by placing in a bag or other container, the result of which being the container being easily upset and/or, if secured within the passenger compartment, taking up valuable passenger space.

A three dimensional body, according to a first embodiment, is supported upon the truck bed and includes a three dimensional body with a substantially rectangular lower body portion and a forwardly sloping and upper body portion. The upper body portion terminates in a front facing wall proximate the cab portion a rear sliding window. A chute inlet is defined in the front facing wall and is arrayed opposite the rear window so that, upon opening the window, waste items may be deposited through the chute inlet. Typically, a hinged flap is mounted about a perimeter of the inlet and is pivotal in an inserting direction to reveal the inlet.

A waste container is provided, substantially rectangular shaped with an open top. The lower body portion of the housing is defined, in part, by an open rear and its interior includes a pair of opposing and extending track portions. Recessed guide portions are likewise defined in opposite end walls of the container and are received by the track portions to slidably engage the waste container within the housing. First and second locking clasps are mounted to the waste container and rear housing surface, respectively, and, upon slidably engaging the container in an inserting direction, and interengaged to affix the container in place. Brackets and engaging fasteners are provided for clamping the housing to the front wall of the truck bed portion.

In a second preferred embodiment, the housing is constructed as a substantially rectangular lower body portion defined by a bottom, front, rear and interconnecting sides. An upper body portion is integrally formed with the front, sides and rear of the lower portion and extend in laterally opposite directions so that the housing defines a first central compartment separating second and third side compartments. A door is defined in the rear of the lower body portion and is opened to reveal the waste container. First and second pivotally actuable covers associate with the second and third side compartments and provide storage capability in addition to the primary waste receptacle holding capability.

A third preferred embodiment discloses the housing in the form of a substantially flattened and tonneau cover. The housing includes a downwardly extending, internally hollowed and substantially rectangular portion, opposing bottom edges thereof defining recessed guide portions. The waste container has a substantially rectangular shape with an open interior and defines, within opposite end walls, a pair of laterally oppositely projecting track portions which seat within the guide portions to slidably engaged the waste container along an underside of the tonneau cover housing. The tonneau cover housing further includes a forward half defining the chute inlet and communicable waste container, a rearward half of the cover is pivotal relative said forward half and, upon opening of the rear half, reveals the installed waste container for removal, emptying and replacement. It is also contemplated that the pivotal rear half of the tonneau cover can be removed.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

Figure 1:
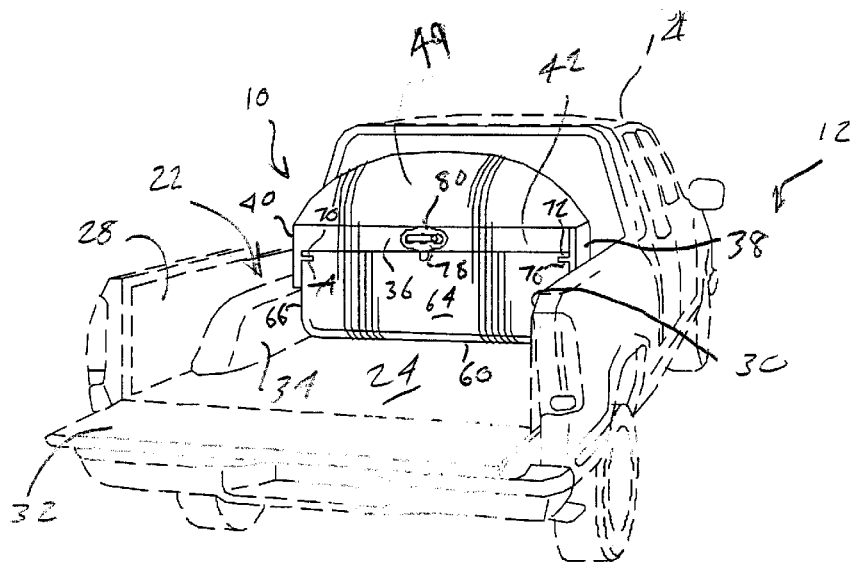
FIG. 1 is a perspective view of the waste chute and container assembly for use with a pickup truck bed and rear sliding window according to a first preferred embodiment of the present invention.

Referring to FIG. 1, a waste chute and container assembly 10 for use with a pickup truck 12 according to the present invention. As previously described, the present invention is an improvement over the prior art in that it provides individuals (see at 14 in FIG. 3) seated within a cab portion 16 of the pickup vehicle 12 the ability to efficiently and effectively deposit waste 18 and other discardable items to a significantly larger holding receptacle located exterior of the vehicle cab. Heretofore, such garbage and waste items have either been left to accumulate within the vehicle interior. Alternatively, attempts have been made to segregate the trash within the vehicle's cab, such as by placing in a bag or other container, the result of which being the container being easily upset and/or, if secured within the passenger compartment, taking up valuable passenger space.

Referring again to FIGS. 1 and 4 in cooperation, the vehicle includes a rear sliding window 20 for facilitating disposal of the waste items 18 from the cab portion 16 to a rear bed portion 22. The bed portion 22 of the truck further includes a bottom 24, front wall 26 and side walls 28 and 30. An optional tailgate portion is illustrated at 32. As is also known, the internal bed portion 22 may also be defined in part by wheel wells 34.

A three dimensional body, according to a first embodiment, is supported upon the truck bed, is constructed of a durable polymer, plasticized or like material, and a substantially rectangular lower body portion defined by a generally open bottom, front 36, sides 38 and 40 and generally open rear 42. An upper body portion is integrally formed with and extends from the lower body portion. The upper body portion includes arcuate sides 44 and 46 and rear 48 which converge (in an aerodynamic fashion) in a front face wall 50 proximate the cab portion 16 and rear sliding window 20.

Figure 2:
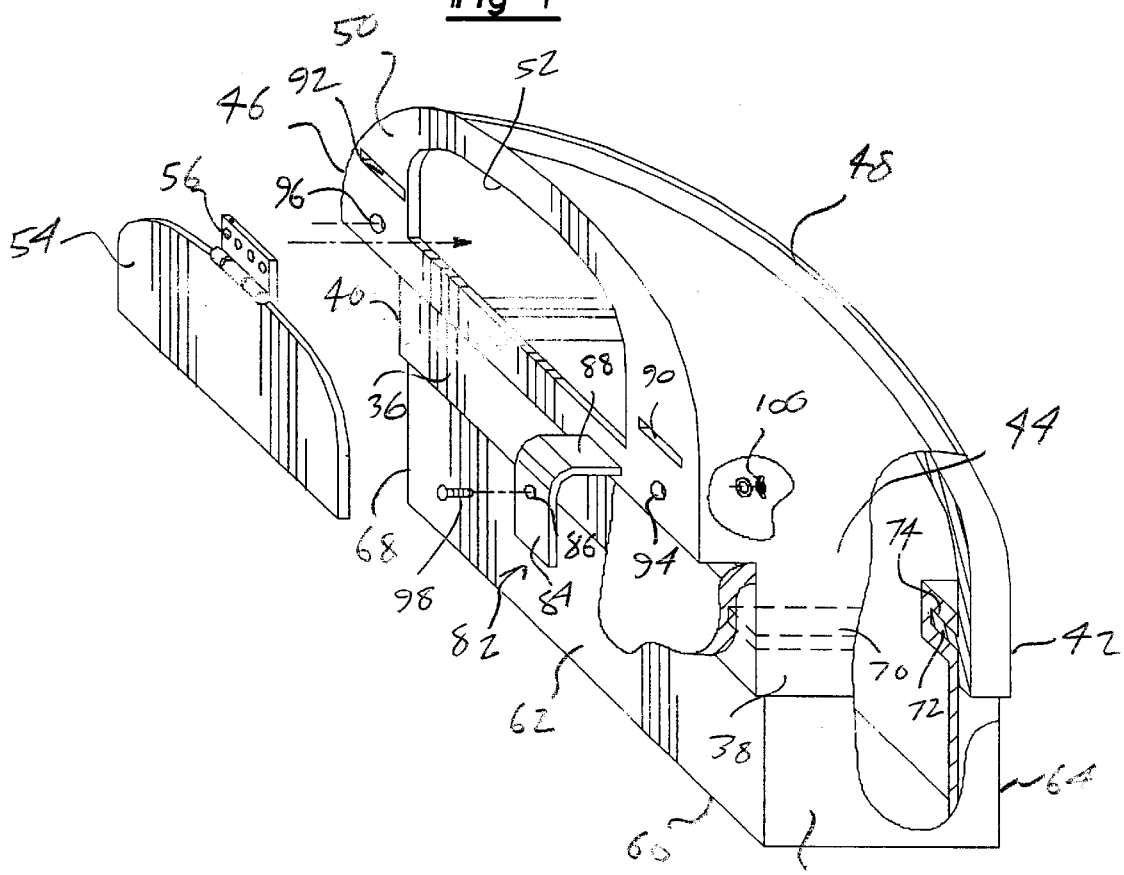
FIG. 2 is an exploded view in partial cutaway of the waste chute and container assembly shown in FIG. 1 and further illustrating the manner in which the assembly is secured to the forward end wall of the truck bed, as well as the manner in which the inlet of the waste chute is accessed.

As best illustrated in FIG. 2, a chute inlet is defined by an inwardly extending perimeter edge 52 in the front facing wall 50 and is arrayed opposite the rear window 20 (as best shown in the environmental side cutaway of FIG. 4) and so that, upon opening the window, waste items may be deposited through the chute inlet 52. Typically, a flap 54 conforming to the outline of the chute inlet 52 is secured to the upper edge of the defining perimeter by a free hinge or, preferably, a spring loaded hinge 56 and so that the flap 54 is pivotally opened in an inserting direction to reveal the inlet 52 and to permit depositing of the waste objects 18.

Figure 3:
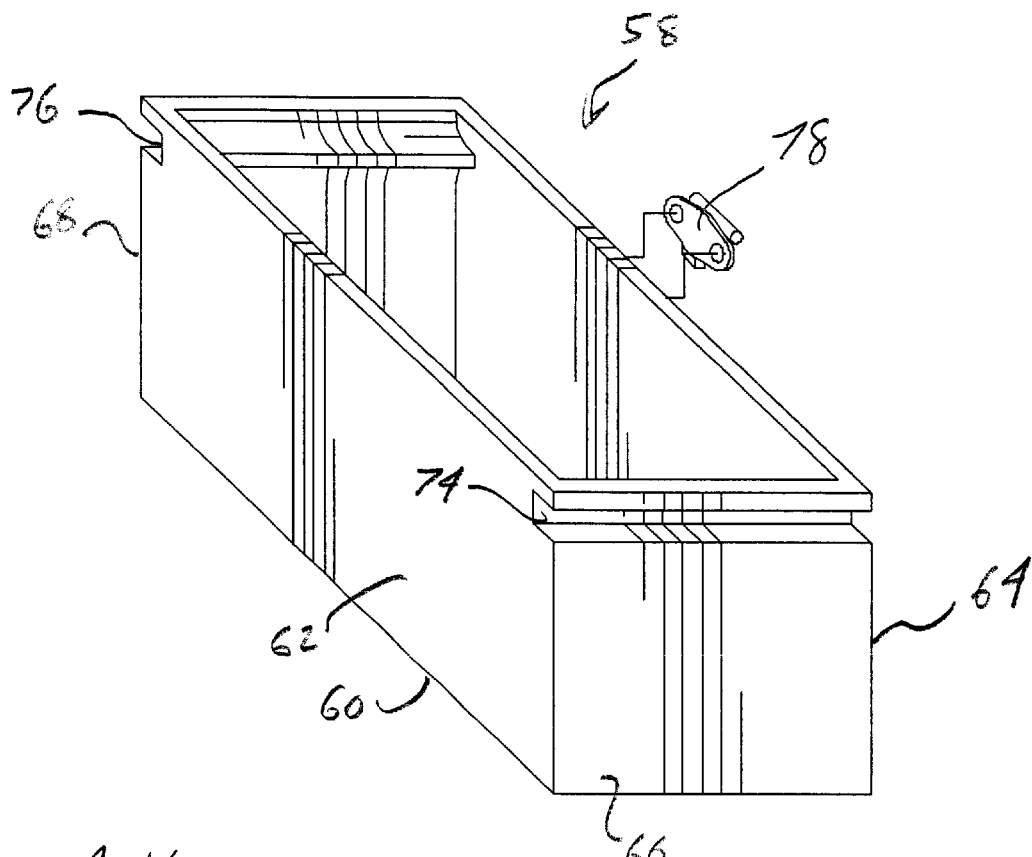
FIG. 3 is a sectional view of the removable container for use with the waste chute assembly and according to the present invention.

A waste container 58, see also FIG. 3, is provided and is substantially rectangular shaped with a bottom 60, forward and rearward sides 62 and 64, interconnecting ends 66 and 68 and an interiorly open top. Referring again to the perspective cutaway of FIG. 2, an open interior of the lower body portion, accessible through its open rear and bottom, includes a pair of opposing track portions 70 and 72 defined in inwardly directed fashion, respectively, from its sides 38 and 40 and in a direction between the front 36 and rear 42.

Recessed guide portions 74 and 76 are likewise defined in the opposite end walls 66 and 68, respectively, of the container 58 and are received by the track portions 70 and 72 to slidably engage the waste container 58 within the housing. First 78 and second 80 locking clasps are mounted to the waste container 58 and rear housing 36 surfaces, respectively. Upon slidably engaging the container 58 in an inserting direction within the housing, the locking clasps 78 and 80 interengage, in any suitable fashion known in the art, to fix the container 58 in place over the open bottom and rear of the housing lower body portion and in order to close off the housing interior.

It is desirable to fixedly secure the housing to the front wall 26 of the pickup bed portion and, to this end, a pair of brackets and engaging fasteners are. Referring again to the exploded view of FIG. 2, and for purposes of ease of illustration, a single bracket 82 is illustrated at one end of the forwardly facing wall 50, it being understood that a second and identical such bracket is likewise provided at the opposite end.

Referring again to FIG. 2, each of the brackets (again at 82) are provided with a first leg 84, through which is formed an aperture 86 and a second and substantially right angled leg 88 which inserts through associated and guiding slots (see at 90 for bracket 82 and at 92 for identical and opposite end bracket not shown) defined in the front facing wall 50 of the housing. Aligning apertures 94 and 96 are likewise formed through the front facing wall 50 of the upper housing body portion and, upon positioning the housing in abutting fashion against the front bed wall 26, bolt 98 and nut/washer 100 fasteners engaged from opposite sides of the brackets 82 and interior of the upper body portion.

Figure 4:
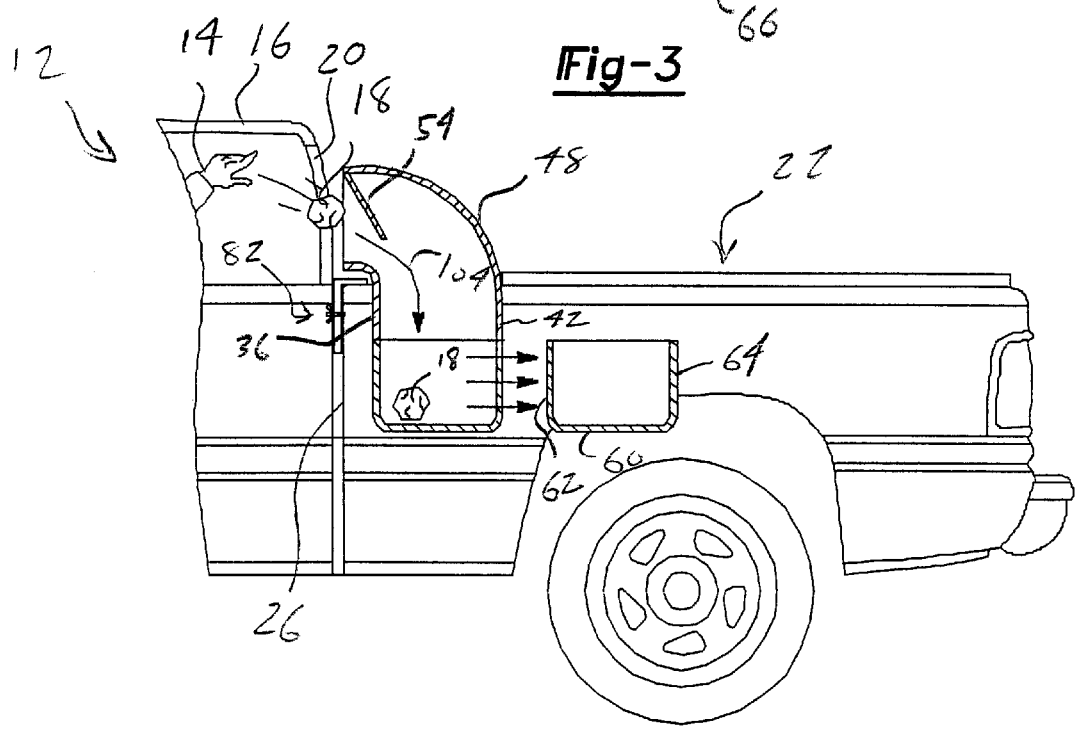
FIG. 4 is a side cutaway view illustrating the manner in which waste is deposited from the rear window of the pickup into the assembly and the manner in which the container is removable for emptying.
Figure 5:
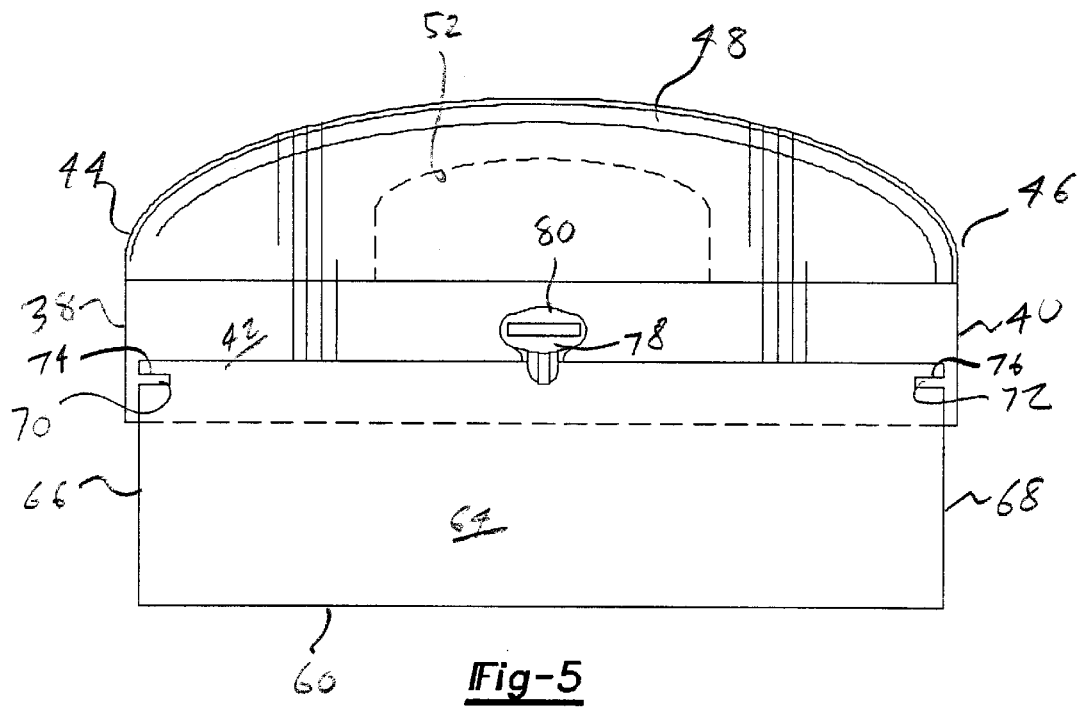
FIG. 5 is a rear view of the chute assembly and illustrating a locking clasp for maintaining the waste container in place.

In this fashion, the assembly 10 is constructed as substantially illustrated in FIGS. 1 and 4 and so that, upon depositing waste objects 18, they communicate and travel within the housing interior (see directional arrow 102 in FIG. 4) and collect within the interior of the waste container 58. When full, the waste container 58 is easily removed from the housing by virtue of the first and second locking clasps and the recess/track arrangement established therebetween.

Figure 6:
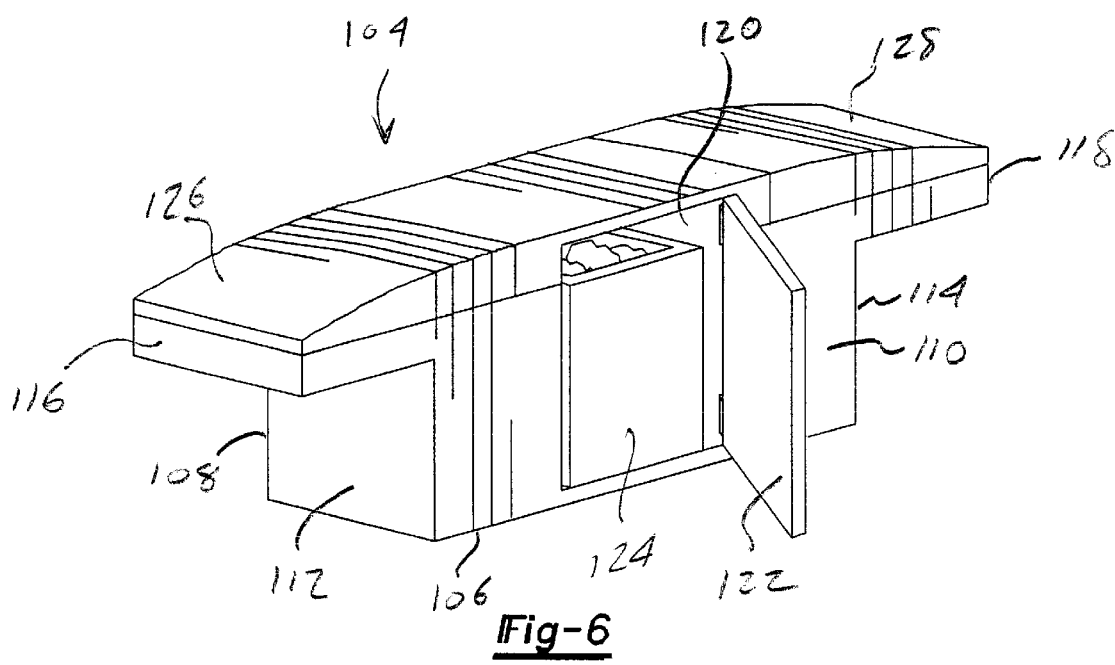
FIG. 6 is a perspective view of the waste chute and container assembly according to a second preferred embodiment of the present invention.
Figure 7:
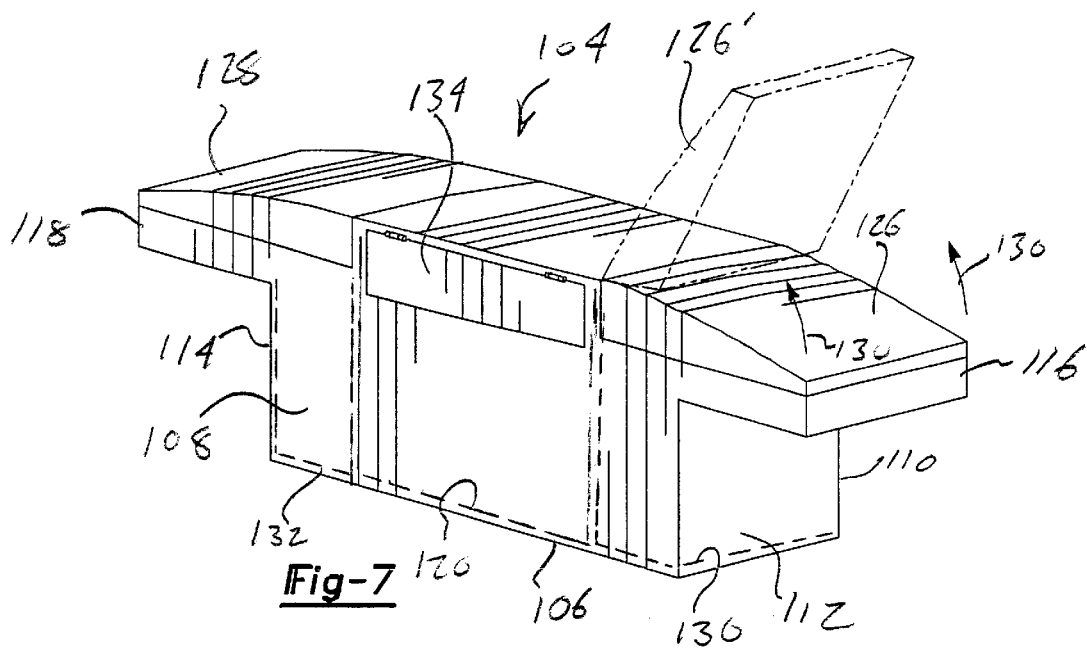
FIG. 7 is a rotated and further perspective view of the waste chute and container assembly of FIG. 6 and illustrating both the waste chute inlet and the optional first and second side storage portions.

Referring now to FIGS. 6 and 7, a waste chute and container assembly is illustrated at 104 according to a second preferred embodiment. A housing is constructed as a substantially rectangular lower body portion defined by a bottom 106, front 108, rear 110 and interconnecting sides 112 and 114. An upper body portion is integrally formed with the front 108, sides 112 and 114 and rear 110 of the lower portion and includes wing portions 116 and 118 which extend in laterally opposite directions so that the housing defines a first central compartment 120 (see in FIG. 6) separating second and third opposite side compartments defined on either side of the central compartment.

A door 122 is defined in the rear 110 of the lower body portion and is hingedly connected to the body so that, upon being opened, reveals the central compartment 120 and a waste container 124 capable of being placed in the compartment. First and second pivotally actuable covers, see at 126 and 128, associate with the second and third side compartments and, upon being pivotally opened as indicated in phantom by cover 126', reveal the associated interior compartment (see also in phantom 130 for second compartment and at 132 for opposite and third compartment) to provide storage capability in addition to the primary waste receptacle 120 holding capability.

As with the first preferred embodiment, a hingedly secured lid 134 may be provided at a suitable upper end location of the front side 108 of the housing and so that, upon being secured within the pickup truck bed, is arrayed in proximate fashion to the rearwardly slidable window 20. It is also contemplated that the housing 104 of the second preferred embodiment may be secured in likewise fashion to the front truck bed wall 26, such as through the use of brackets 82 identified in the first preferred embodiment. However, it is also understood that other suitable securing means for affixing the housing proximate the front end wall of the pickup truck bed may be employed and without departing from the scope of the invention.

Figure 8:
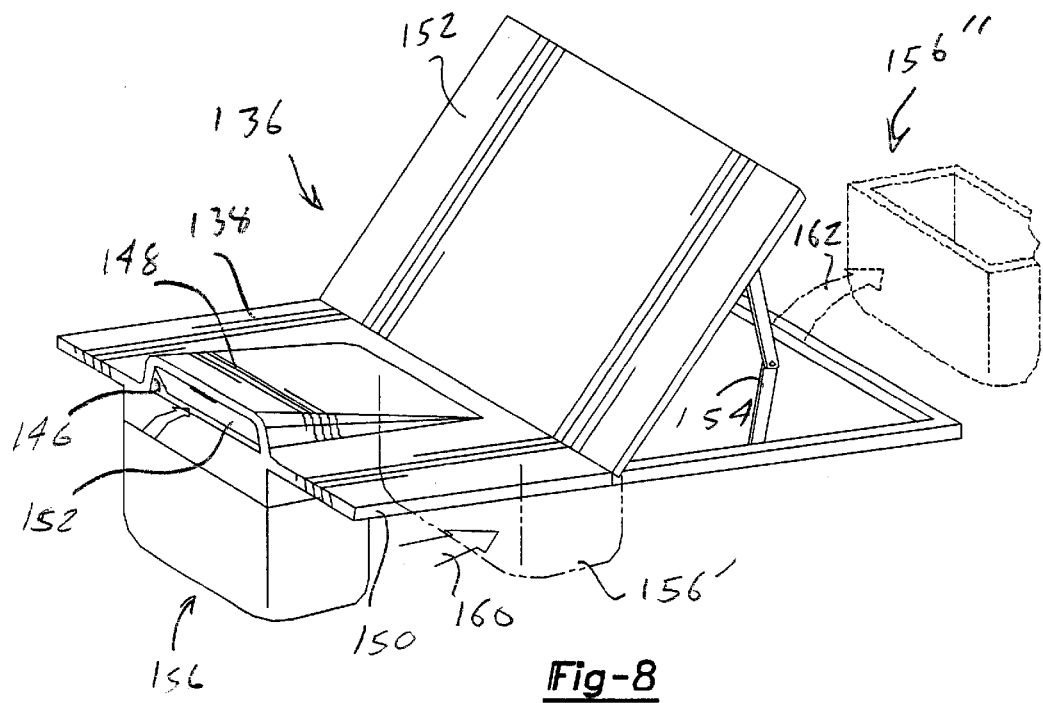
FIG. 8 is a perspective view of the waste chute and container assembly according to a third preferred embodiment of the present invention integrated into a substantially tonneau hard cover.
Figure 9:
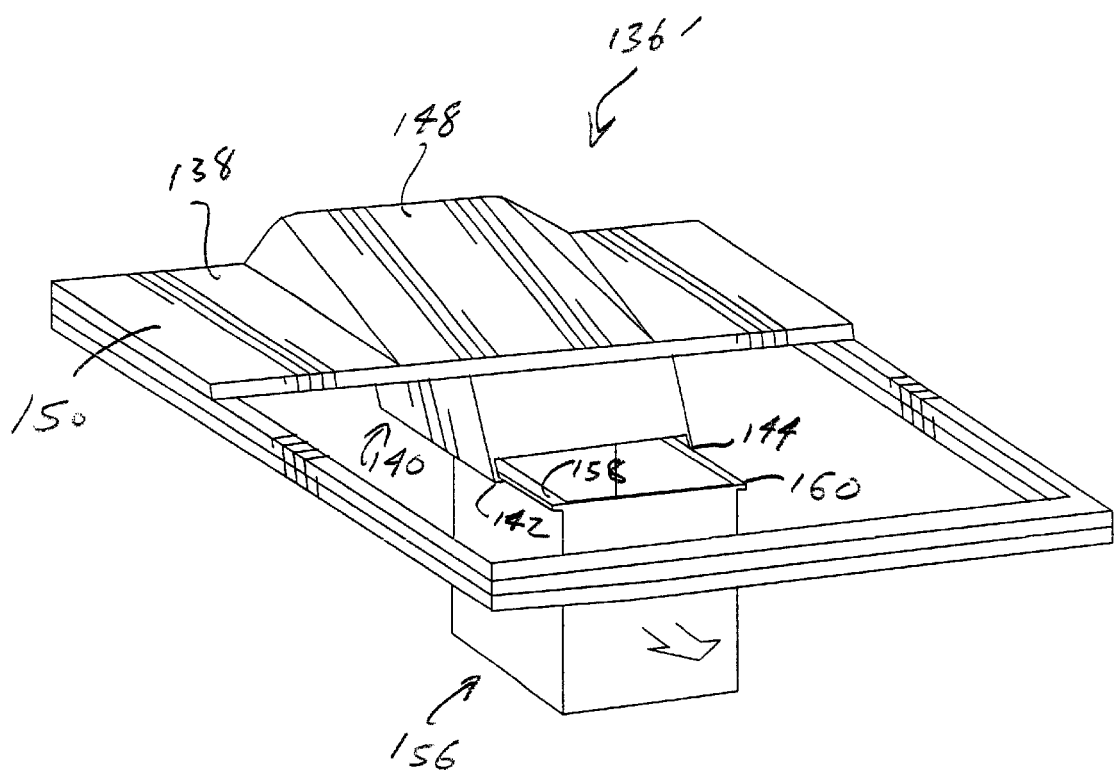
FIG. 9 is a rotated and further perspective view of the waste chute and container assembly of FIG. 8 and illustrating the removable nature of the waste container.

Referring finally to FIGS. 8 and 9, a waste chute and container assembly is illustrated at 136 according to a third preferred embodiment discloses the housing in the form of a substantially flattened and tonneau cover 138 which is arrayed to substantially cover the top edge perimeter of the truck bed. The tonneau housing 138 includes, at a substantially forward end, a downwardly extending, internally hollowed and substantially rectangular portion 140 (see also FIG. 9) with opposing bottom edges defining, therebetween, recessed guide portions 142 and 144.

A chute inlet 146 is defined in a front facing surface of an upwardly flared portion 148 projecting from a first fixed and forward half 150 of the tonneau cover. A chute inlet 152 is pivotally secured over the chute inlet 146 in a manner as substantially previously described. The tonneau cover further includes a rearward half 152 which is upwardly pivotal relative to the forward half 150, such as through the use of linkage assemblies illustrated at 154 in FIG. 8.

A waste container 156 is provided and has a substantially rectangular shape with an open interior and defines, as best again illustrated in FIG. 9 opposite end walls defining therebetween a pair of laterally oppositely projecting track portions 158 and 160 which seat, respectively, within the guide portions 142 and 144 to slidably engaged the waste container 156 along an underside of the tonneau cover housing. The rearward half 152 of the cover is pivotal relative said forward half (as best illustrated in FIG. 8) and, upon opening of the rear half 152, reveals the installed waste container 156 for removal (see directional line 162) to a first slidably disengaged position 156'. The container is then withdrawn from the truck bed interior, by the pivoting opening of the rearward tonneau cover portion 152 and in a direction indicated by succeeding arrow 162 to a fully removed position 156" for subsequent emptying and replacement. It is also contemplated that the pivotal rear half of the tonneau cover can be removed and as is illustrated in the alternate variant 136' of FIG. 9.

Having described my invention, additional preferred embodiments will become apparent to those skilled in the art to which it pertains and without deviating from the scope of the appended claims:

I claim:

1. A waste chute and container assembly for use with a pickup truck, the truck having a cab portion and a bed portion defined by at least a bottom, front wall and sides, a rear sliding window separating the cab and bed portions, said assembly comprising:

a three dimensional housing supported upon the truck bed portion proximate its front wall, said housing defining a substantially hollowed interior;

a chute inlet defined in a forwardly projecting location of said housing and which is arrayed proximate the rear sliding window for receiving in inserting fashion items deposited by individuals seated within the cab portion; and a waste container secured to said hollowed interior and communicable by items placed in said chute inlet, said waste container capable of being removed, from a rear of said housing, emptied and reattached to said housing.

2. The waste chute and container assembly as described in claim 1, said housing further comprising an interior surface from which extend a pair of opposing and extending track portions, said waste container having a substantially rectangular shape with an open interior and defining, within opposite end walls, a pair of recessed guide portions which receive said track portions to slidably engage said waste container to said housing.

3. The waste chute and container assembly as described in claim 2, said housing further comprising a substantially rectangular lower body portion defined by an open bottom, front, open rear and sides, said housing further including an upper body portion extending in forwardly sloping fashion from said front, rear and sides, said upper body portion terminating in a front facing wall proximate the cab portion and rear sliding window and within which is defined said chute inlet.

4. The waste chute and container assembly as described in claim 3, further comprising clamping means for securing said housing to the front wall of the vehicle bed portion.

5. The waste chute and container assembly as described in claim 4, said clamping means further comprising a pair of brackets, each of said brackets including an aperture defined therethrough which aligns with an associating aperture formed through said front facing wall of said upper body portion, bolt and nut fasteners engaging from opposite sides of said brackets and upper body portion.

6. The waste chute and container assembly as described in claim 5, each of said brackets further comprising a first leg, through which is formed said aperture, and a second and substantially right angled leg which inserts through an associated and guiding slot defined in said front facing wall of said housing.

7. The waste chute and container assembly as described in claim 3, further comprising a lid hingedly secured to said front facing wall and pivotal to reveal said chute inlet.

8. The waste chute and container assembly as described in claim 3, said waste container further comprising a first locking clasp mounted to an upper rear edge location thereof, a second locking clasp mounted to said housing body at a location proximate an upper perimeter edge of said open rear, said first and second clasps interlocking upon installation of said waste container along said track portions and to said housing.

9. A waste chute and container assembly for use with a pickup truck, the truck having a cab portion and a bed portion defined by at least a bottom, front wall and sides, a rear sliding window separating the cab and bed portions, said assembly comprising:

a housing supported upon the truck bed portion and located proximate its front wall, said housing defining a substantially hollowed interior within which are defined a pair of opposing and extending track portions;

a chute inlet defined in a forwardly projecting location of said housing and which is arrayed proximate the rear sliding window for receiving in inserting fashion items deposited by individuals seated within the cab portion; and a waste container secured to said hollowed interior and communicable by items placed in said chute inlet, said waste container including a pair of recessed guide portions which receive said track portions to slidably engage said waste container to said housing and permit said container to be disengaged, from a rear of said housing, emptied and reattached to said housing.

10. A waste chute and container assembly for use with a pickup truck, the truck having a cab portion and a bed portion defined by at least a bottom, front wall and sides, a rear sliding window separating the cab and bed portions, said assembly comprising:

a three dimensional housing supported upon the truck bed portion;

a chute inlet defined in said housing, said chute inlet projecting forwardly to a location proximate the rear sliding window, said chute inlet receiving, in inserting fashion, items deposited by individuals seated within the cab portion; and a waste container secured to said housing and communicable by items placed in said chute inlet, said waste container capable of being removed from a rear of said housing, emptied and reinstalled to said housing.

* * * * *